Feb. 25, 1941.   B. E. MEURK ET AL   2,233,321
STEAM PLANT INSTALLATION AND OPERATING PROCEDURE FOR DISTILLING WATER
Filed Nov. 17, 1938   3 Sheets-Sheet 1

INVENTORS
BENGT E. MEURK
BARTON H. NOLAND
BY
ATTORNEYS

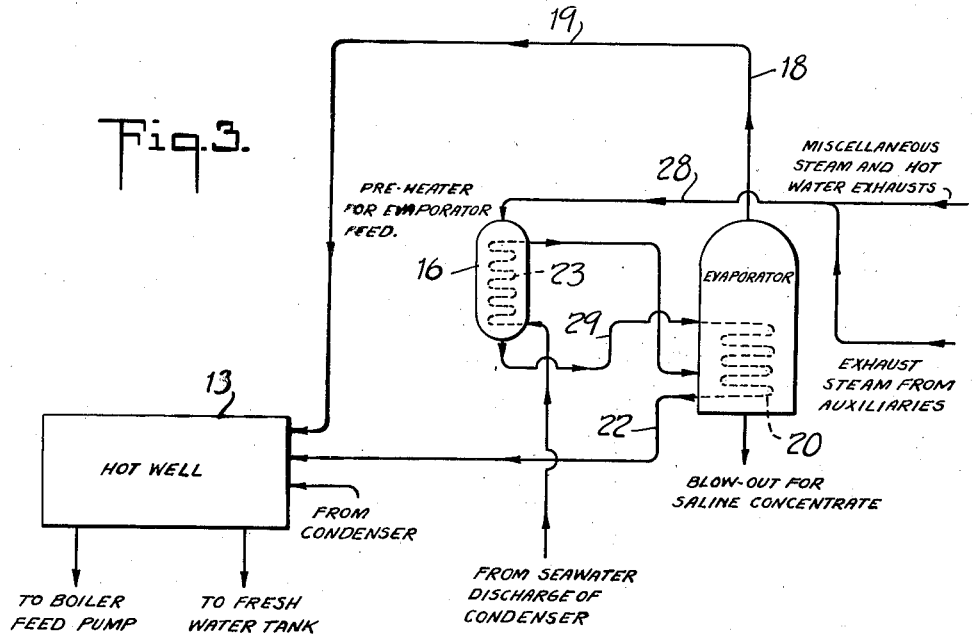
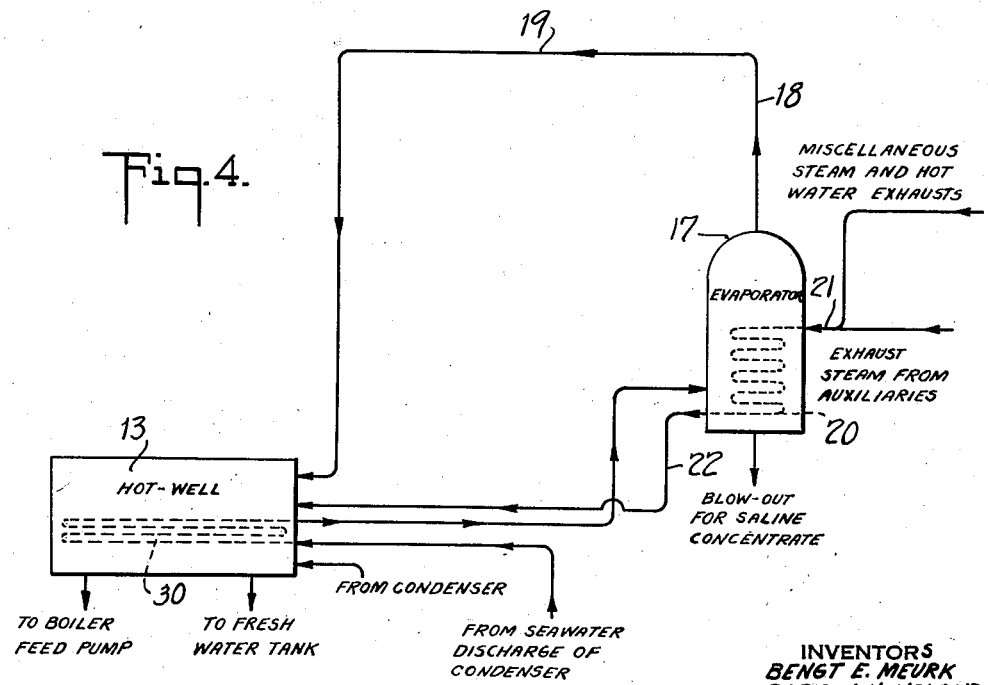

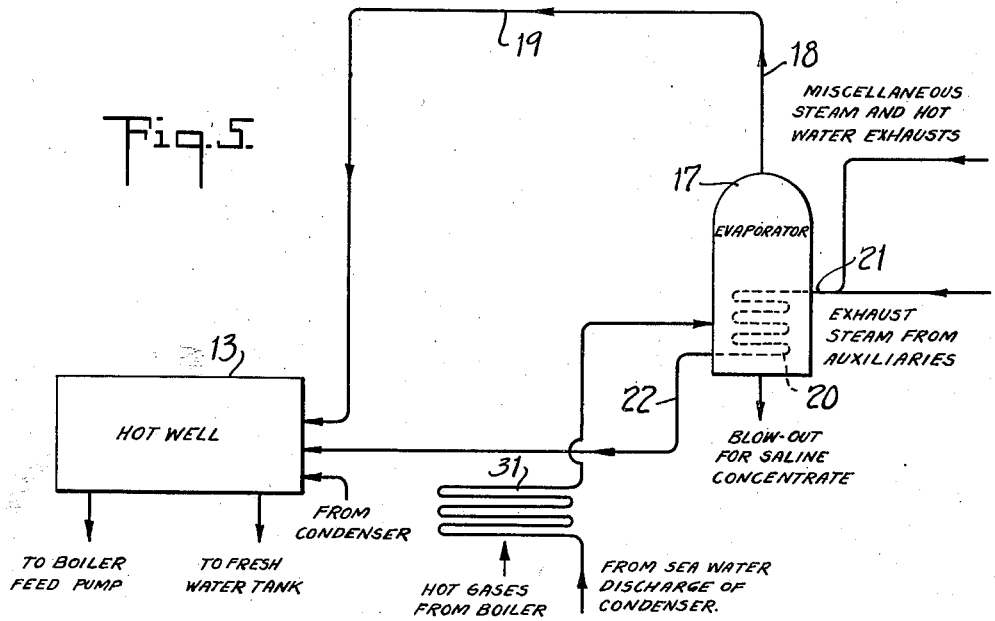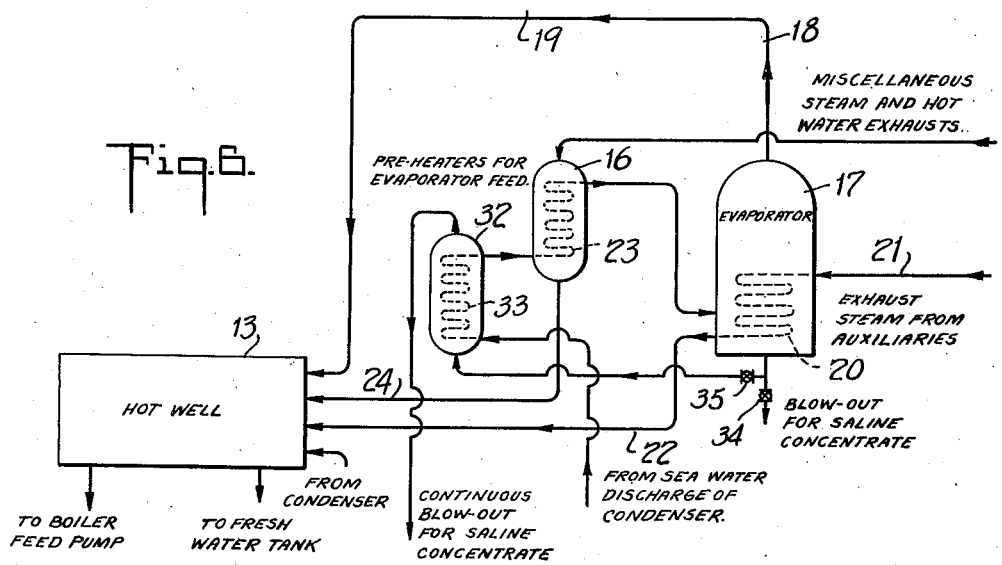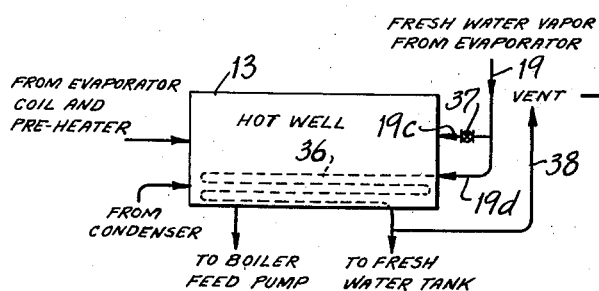

Patented Feb. 25, 1941

2,233,321

UNITED STATES PATENT OFFICE 2,233,321

STEAM PLANT INSTALLATION AND OPERATING PROCEDURE FOR DISTILLING WATER

Bengt E. Meurk, Montclair, N. J., and Barton H. Noland, New York, N. Y.

Application November 17, 1938, Serial No. 241,020

3 Claims. (Cl. 122—1)

Our present invention relates generally to the operation of steam plants, and has particular reference to a novel installation and operating procedure whose primary objective is the economic production of fresh water by distillation.

Our invention is primarily intended for a steam plant in which sea water is readily available, and for this reason the invention is particularly valuable for marine plants, although it will be understood that it is equally applicable to many industrial plants ashore, wherever the distilling of water is or can be resorted to.

A typical merchant vessel, operated by steam, requires about ten tons of fresh water per day, five of which are needed for domestic use, and five of which enter as "make up" water into the steam plant. The latter is customarily constituted of a closed circulatory system of steam-generating, steam-utilizing, and steam-condensing apparatus.

It has often been found, in practice, to be more economical to purchase this fresh water than to produce it by distilling sea water. By way of example, a merchant vessel travelling from Honolulu to New York will require approximately two hundred sixty tons of fresh water for the trip, and this can be purchased, at today's prices, for approximately eighty dollars, whereas the cost of producing this water during the trip, by distilling sea water, is usually considerably greater.

However, where a cargo is available, the revenue derived from two hundred sixty tons of cargo is so proportionately high, that the storage of fresh water, purchased in advance of the trip, becomes undesirable.

We have devised an installation and operating procedure by means of which fresh water may be continuously produced, as and when needed, in so economical a fashion that the preliminary purchase of water, regardless of how cheap it may be, need never be resorted to under any circumstances. Tests have shown that our present installation and procedure can be used practically without any extra cost whatsoever.

In accordance with our invention sea water is introduced into an evaporator and distilled. This in itself is a customary procedure, but it is a special feature of our present invention to carry on the distillation in such a manner that the latent heat of the fresh water vapor is conserved and restored to the steam plant system. Moreover, in furtherance of our general objective, we utilize warmed sea water, preferably the sea water discharge from the steam condensing apparatus of the system; and we provide for a further preheating of this warm sea water, and for the operation of the evaporator, by means of heat which is drawn from the system itself.

The evaporator forming a part of the present installation may be operated either with a continuous blow-off of saline concentrate, or with an intermittent blow-off. Disadvantages arising from an undesirable formation of scale, and the consequent necessity for frequent interruption and cleaning, are avoided by maintaining a low saline concentration. This, with the low temperature of the steam used in the heating coils, prevents the formation of scale.

We accomplish these general objects and advantages, and such other objects as may hereinafter appear or be pointed out, in the manner illustratively exemplified in the accompanying drawings in which:

Figure 1 is a flow-sheet of the essential elements of a typical steam plant installation of the present improved character;

Figures 2–6 inclusive are, respectively, flow-sheets showing possible modifications of our invention; and Figure 7 is a fragmentary flow-sheet showing a further modification.

In Figure 1 we have included a showing of the conventional circulatory system which comprises the steam generating apparatus or boiler 10, steam-utilizing apparatus consisting generally of the prime mover 9 and auxiliary steam consumers 11, and the steam condensing apparatus 12. The live steam from the boiler 10 is conducted directly to the prime mover 9 and the auxiliary steam consumers 11, and the latter term is intended to include steam radiators, laundries, or other apparatus which utilizes steam from the boiler. The exhausts from the steam consumers lead ultimately to the condenser 12, the cooling medium of which is sea water which passes through the condenser, and which becomes heated to a temperature between 85° and 105° F. in performing its condensing function. This warmed sea water is discharged overboard and constitutes one of the two major elements of what are nowadays considered inevitable heat losses. The other major heat loss takes place through the hot gases leaving the boiler and escaping through the stack.

The condensate from the condenser 12 is conducted to the feed and filter tank, or hot well 13; and from the hot well the water is returned to the boiler through the boiler feed pump 14 and the feed water heater 15.

Water is also drawn off from the hot well to the fresh water tank which serves as a reservoir for the water used for domestic purposes, i. e., for washing, cleaning, etc. The water from the fresh water tank is not used, however, for drinking purposes or in the preparation of foods.

In accordance with our present invention sea water is caused to pass through a preheater 16, and is then fed into an evaporator 17. Preferably, this sea water is drawn from the warmed circulating water discharged from any convenient heat exchanger; and we have found it to be of particular advantage to draw this sea water from the circulating water discharge from the condenser 12. Preferably, a scoop is arranged within the condenser discharge line, and the velocity head engendered by this scoop may be sufficient to direct this sea water through the preheater and into the evaporator. It will be understood, however, that a booster pump may be utilized for this purpose, as and when it may be deemed desirable.

A primary and characterizing feature of the present invention lies in the fact that the fresh water vapor emanating from the evaporator is condensed in a manner and by a means which restores its latent heat to the steam plant. In Figure 1, a conduit 19 conveys this vapor directly to the hot well 13, the conduit preferably having an end which is open, as by means of perforations, and which is disposed beneath the water level in the hot well. As a result, the water in the hot well serves as the condensing medium for the fresh water vapor, and at the same time, the latent heat which is absorbed by the water in the hot well raises the temperature of this water. This increase in temperature of the hot well reduces, in turn, the amount of work which the feed water heater 15 has to do.

We have shown a stand pipe 18 leading from the evaporator 17, and this pipe is relatively large and of substantial height, for example, twenty feet or so, in order to permit unevaporated particles of sea water to fall back into the evaporator. However, it will be understood that any commercial steam separator or dryer can be used for this purpose. The conduit 19 may be of course of any desired suitable reduced diameter.

In accordance with our invention, the evaporator 17 and the preheater 16 are operated by means of heat drawn from the steam plant itself. In Figure 1 we have shown a valve 8 or equivalent instrumentality in the exhaust steam line, controlling the passage of low-pressure exhaust steam into the conduit 21 leading from this line to a coil 20 in the evaporator. There is thus fed into the coil 20 a heating medium which we have designated "exhaust steam from auxiliaries." By this term we intend to refer not only to the low pressure exhaust steam leaving steam consumers other than the prime mover, but also to other sources of waste steam. This heating medium, whatever its source may be, leaves the evaporator through the pipe 22 which leads back to the hot well 13. In this pipe, as well as in other pipes and conduits, wherever necessary or desirable, a trap or traps may be arranged.

Similarly, we have shown a coil 23 in the preheater 16. The sea water that is fed to the evaporator passes through this coil, and in the preheater 16 this coil is subjected to the heating action of a medium which we have designated "miscellaneous steam and hot water exhausts." By this term we intend to refer, broadly, to various sources of waste heat, such as low pressure exhaust steam, drains from steam traps, etc. This heating medium after passing through the preheater 16, is directed by the pipe 24 back to the hot well 13.

The unusual efficiency of our invention is based upon the fact that the major portion of the heat entering the evaporator through the pipe 21 is conserved. Whatever heat may be given up by the steam in producing fresh water vapor in the stand pipe 18, is restored to the system in the hot well 13. Similarly, whatever heat is absorbed by the coil 23 is restored to the system through the evaporator 17. The only heat which is definitely lost is that which is carried away by the saline concentrate, and this is a negligible amount.

In Figure 2 we have shown a modification in which the heating medium for the preheater 16 is the fresh water vapor itself. In this installation, the conduit 19 is provided with two parallel branches 19a and 19b. The former leads directly to the hot well 13, while the latter leads through the preheater 16. By controlling the relative amounts of fresh water vapor flowing through the branches 19a and 19b, through manipulation of the valves 25, 26 and 26a, it is possible to control the temperature of the hot well 13. Whatever fresh water vapor passes through the heater 16 is caused to condense, and the latent heat which is given up serves to preheat the sea water that is fed to the evaporator. This latent heat is thus conserved and ultimately restored to the system.

If desired, the fresh water tank may draw its supply directly from the branch 19b, as for example, through the pipe 27.

In other respects, the modified installation of Figure 2 is like that of Figure 1, except that the pipe 21 in this case conducts to the coil 20 the combined steam and hot water exhausts which are illustratively shown in two separate pipes in Figure 1.

In Figure 3, the combined steam and hot water exhausts are conducted through a pipe 28 to the preheater 16, and thence through a pipe 29 to the coil 20. In other respects this installation is the same as that shown in Figure 1.

In Figure 4, a preheater 16 is dispensed with, and its function is fulfilled by a coil 30 immersed within the hot well 13. The sea water passing through the coil 30, on its way to the evaporator 17, is preheated by the water in the hot well; and at the same time this heat exchange serves to prevent the water in the hot well from reaching an undesirably excessive temperature.

In Figure 5 we have shown a modification which is substantially the same as that of Figure 4 except that the evaporator feed is preheated by means of a coil 31 which is so arranged as to be subjected to the heating action of the hot gases leaving the boiler. The coil 31 might be positioned, for example, either in the smoke stack itself, or in the juncture between the boiler and the base of the stack, generally known as the "boiler uptake."

The installation shown for illustrative purposes in Figure 6 is substantially the same as that shown in Figure 1, except that a further heat conservation is effected by passing the warm saline concentrate through an auxiliary preheater 32. In this heater there is a coil 33 through which the sea water passes on its way through the preheater 16 to the evaporator 17. In this arrangement, the blow-out of saline concentrate through the preheater 32 is continuous in character. It will be noted that the ordinary blow-out is also provided for, and that valves 34 and 35 control the path of the saline concentrate.

In the arrangement shown in Figure 6, the temperature of the saline concentrate leaving the evaporator 17 is approximately 218° F., whereas the temperature of this concentrate when it leaves the heater 32 is approximately 130° F. The difference represents the heat which has been restored to the system through the coil 33.

In Figure 7 we have shown an optional variation in the manner in which the fresh water vapor is condensed in the hot well. The conduit 19, in this case, terminates in two parallel branches 19c and 19d. The branch 19c is open and leads the vapor below the water level of the hot well where it is condensed and where it merges with the water in the hot well. The branch 19d is sealed from the hot well, and is in the form of a coil 36 within which the fresh water may condense and from which it may then be fed to the fresh water tank. The advantage of this arrangement is that the fresh water condensate remains uncontaminated by the water in the hot well. This is often desirable because the water in the hot well is generally treated chemically to condition it for use in the boiler.

A valve 37 permits selected quantities of the fresh water vapor to be introduced directly into the hot well and to merge with the water in the latter. A vent 38 is also preferable, in an arrangement of this kind, to prevent any water from syphoning form the fresh water tank back into the evaporator.

In all of the accompanying drawings, steam traps have been omitted but, as hereinbefore stated, it will be understood that they may be arranged wherever their use is deemed to be expedient. Similarly, valves and pumps, and other minor accessories and fittings have been omitted, except where the use of the valves has a particular bearing upon the particular mode of operation which is the subject matter of our invention. It will be understood, however, that valves may readily be inserted, wherever their presence is deemed desirable or expedient; and that pumps and similar accessories may also be used wherever the contemplated flow of liquid or gases necessitates their use.

The present invention is not necessarily restricted to marine work, and the term sea water as used in the appended claims is intended to include within its scope any water or liquid whose distillation results in producing fresh water for the steam plant.

Where the present invention is installed in an industrial plant, for the purpose of distilling water other than sea water, it is of added benefit in eliminating the necessity for large and expensive water-softening plants and expensive chemical treatment of boiler feed water, such plants and treatment being customarily necessary to eliminate permanent and temporary hardness generally existing in available fresh water.

In general, the present system is uniquely economical and when adapted to a steam plant installation, it can be operated practically without extra cost, because it should be borne in mind that the heat used comes from the steam plant itself, and that it is all conserved except for the blow-out of saline concentrate. This latter loss, however, may be compensated for, at least to a large measure, by the illustrative utilization of warmed sea water from a heat-exchanger such as the condenser.

In general, it will be understood that changes in the details, herein described and illustrated for the purpose of explaining the nature of our invention, may be made by those skilled in the art without departing from the spirit and scope of the invention as expressed in the appended claims. It is therefore, intended that these details be interpreted as illustrative, and not in a limiting sense.

Having thus described our invention, and illustrated its use, what we claim as new and desire to secure by Letters Patent is:

1. In a steam plant, a boiler, steam-utilizing apparatus including steam-using auxiliaries connected to utilize the steam generated by said boiler, a condenser connected to condense the exhaust steam discharged from said steam-utilizing apparatus, a hot well connected to said condenser and arranged to accumulate at atmospheric pressure the condensate from said condenser, means for feeding said condensate from said hot well to said boiler, an evaporator, means for feeding sea water to the evaporator, means for heating the water in the evaporator by means of exhaust steam from said auxiliaries having such low-pressure as to generate fresh water vapor at substantially atmospheric pressure in said evaporator, and means for transferring to said hot well the latent heat of said fresh water vapor, thereby conserving said heat and condensing said fresh water vapor.

2. In a steam plant, the combination set forth in claim 1, said last-named means comprising a conduit extending from the evaporator, said conduit having parallel branches one of which leads into the hot well, a preheater in the other branch, means for conducting through said preheater the sea water that is fed to the evaporator, and means for controlling the relative operability of said conduit branches.

3. In a steam plant, the combination set forth in claim 1, said last-named means comprising a conduit extending from the evaporator to a submerged position in said hot well, said conduit having a branch which opens into the hot well and conducts the fresh water vapor directly into the condensate in said hot well, and a parallel branch submerged in but sealed from said condensate, whereby the fresh water condensing in said sealed branch does not merge with said condensate.

BENGT E. MEURK.
BARTON H. NOLAND.